Figure 1:
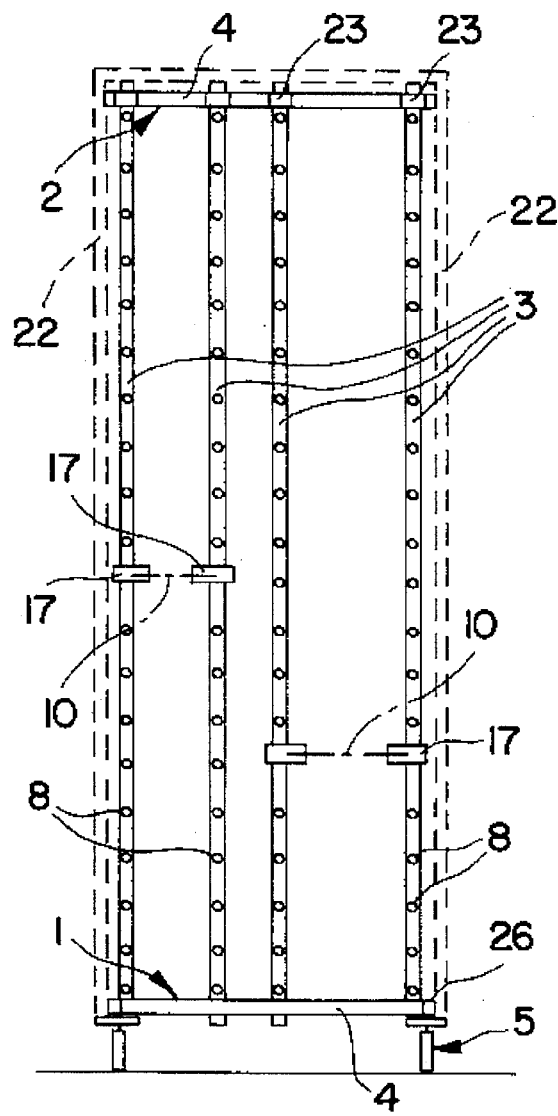

United States Patent [19]

Held

[11] Patent Number: 5,538,145
[45] Date of Patent: Jul. 23, 1996

[54] RACK FOR SUPPORTING MUTUALLY SPACED-APART PLATES

[75] Inventor: Hubert Held, Lans, Austria

[73] Assignee: Futscher & Co., H.u.W. Held Gesellschaft m.b.H. & Co. KG., Innsbruck, Austria

[21] Appl. No.: 301,117

[22] Filed: Sep. 6, 1994

Related U.S. Application Data

[63] Continuation-in-part of Ser. No. 190,151, Jun. 10, 1994, abandoned.

[30] Foreign Application Priority Data

Aug. 8, 1991 [DE] Germany .......................... 41 26 315.4
Nov. 4, 1991 [DE] Germany .......................... 9113715 U
Sep. 10, 1993 [DE] Germany .......................... 9313734 U

[51] Int. Cl.$^6$ .................................................. A47F 5/00
[52] U.S. Cl. .............................. 211/41; 211/71; 312/128; 312/249.13
[58] Field of Search ........................ 211/41, 71, 126; 312/116, 128, 129, 132, 266, 267, 249.8, 249.12, 249.13

[56] References Cited

U.S. PATENT DOCUMENTS

| | | | |
|---|---|---|---|
| 3,205,033 | 9/1965 | Stentz | 312/128 X |
| 3,797,903 | 3/1974 | Traulsen | 312/128 X |
| 4,796,960 | 1/1989 | Candelas | 312/249.13 X |
| 4,911,308 | 3/1990 | Nylund | 211/71 X |
| 5,330,060 | 7/1994 | Bohner | 211/41 |
| 5,464,279 | 11/1995 | Wells et al. | 312/128 |

FOREIGN PATENT DOCUMENTS

| | | |
|---|---|---|
| 373127 | 6/1990 | European Pat. Off. . |
| 432813 | 6/1991 | European Pat. Off. . |
| 2597741 | 10/1987 | France . |
| 2615087 | 11/1988 | France . |
| 8914138 | 3/1990 | Germany . |
| 290155 | 7/1953 | Switzerland . |
| 661193 | 7/1987 | Switzerland . |
| 763713 | 12/1956 | United Kingdom . |

*Primary Examiner*—Robert W. Gibson, Jr.
*Attorney, Agent, or Firm*—Lorusso & Loud

[57] ABSTRACT

For the spaced-apart positioning of plates with prepared food in at least one stack, a rack comprises a bottom frame, a top frame and vertical beams fixed to said bottom frame and said top frame. Support elements comprising plate support rods are arranged at said support beams. At least three plate support regions provide wobble-free support for each plate. The plate stacks are arranged in pairs on both sides of an imaginary vertical central plane.

19 Claims, 6 Drawing Sheets

RACK FOR SUPPORTING MUTUALLY SPACED-APART PLATES

CROSS-REFERENCE TO RELATED APPLICATIONS

This application claims priority to German Application No. G 92 13 734.6 filed Sep. 10, 1993. This application also is a Continuation-in-Part of U.S. patent application Ser. No. 08/190,151 filed Jun. 10, 1994, abandoned, which is the U.S. National Phase of PCT/AT92/00112 filed Aug. 7, 1992, which claims priorities to German P 41 26 315.4 filed Aug. 8, 1991 and German G 91 13 715.2 filed Nov. 4, 1991, the teachings in these patents and/or applications being herein incorporated by reference.

The invention relates to a rack for the spaced-apart positioning of plates in at least one stack, with support elements comprising plate support rods, carried by at least one vertical support beam and forming two lower plate support regions for each plate.

Such plate racks serve, above all, for the allocation of a greater amount of cold foods in the hotel and restaurant business. In a plate rack known from DE-U 89 14 138, two rake-like plate supports are provided per plate stack at frame rods arranged in a pentagon and consist, in each case, of a vertical support beam and plate-support rods protruding parallel therefrom. The space between the support beams is adjustable to the plate size. Each plate support rod is provided with an anti-skid coating. Since the plates usually comprise an inclined edge, the rim portion of a plate, the plate lies on only two points and has the tendency to wobble.

The same two-point support is also given in the plate stand according to EP-A 373 127 whose bottom and top frames comprise in each case four frame rods lying in the diagonals of a square. Each of the four fixed support beams carries L-shaped bent plate-support rods so that two parallel racks are made available per plate stack. If the distance between the racks for a plate stack is to be changed, the respective support beam on the frame rods is displaced. This also effects a change of one rack of the adjacent pair of racks so that two stacks of greater plates can be arranged which, however, rest only on support rods projecting to different extents so that the supporting safety is reduced.

In a plate rack known from FR-A 2 615 087, three ladders per plate stack are arranged in a triangle so that each plate lies on three support rods. The support is thus fundamentally free from wobble, the insertion and removal is difficult, however, since the plate must be slid through a further ladder.

Another plate rack is shown in EP-A 432 813, where on each side of a multi-sided central support beam two upper rods and a lower rod are provided per plate. The rods protrude only slightly from the central support beam and are so arranged that rim portion of the plate can be slid in between, thus lying on the bottom rod and adjoining the two upper rods from below. Although the obtained support is sufficient by this fixed positioning the danger exists that the clamped rim portion of the plate can break off. Furthermore, no plate covering can be provided here. Depending on the thickness of the plates, the plate hangs more or less at an incline.

A first object of the invention is to provide a plane, wobble-free position of a plate, if needed with a cover, a second object is to provide easy insertion and removal possibilities, a third object is to provide the possibility to independently adapt the supports for each plate stack, and a fourth object is a maximal utilization of space.

A first embodiment of the plate rack according to the invention is characterized in that for each plate there are provided a third lower and fourth upper plate support region arranged at a support element comprising a forked piece and having a laterally open insertion slot for the plate rim.

In particular with two plate support rods lying parallel, the two lower plate support regions lie in any case diametrically in respect of the inserted plate, the third lower plate support region of the forked piece preventing a backward tilting of the plate, and the fourth upper plate support region of the forked piece excluding a forward tilting of the plate. The plates therefore lie wobble-free in the rack with the plate rim inserted in the insertion slot.

If the insertion slot is V-shaped, plate rims of various thickness are held wobble-free if the plate is slid in the forked piece up to the respective stop. Preferably, the forked piece is arranged at a collar enclosing the support beam and being in particular height-adjustable. With two parallel plate support rods, the forked piece extends in the free space between the plate support rods. If one plate support rod, each, protrudes from a support beam, so that two support racks are provided, in each case consisting of a support beam and a number of support rods for the plate stack, a support element comprising a forked piece is arranged preferably at each support beam. The plate is then inserted in both forked pieces and thus lies upon six support regions. With the plate support rod protruding from the support beam, the collars of the forked pieces can be slid on the support beam until they lie on the protruding plate support rod.

In a further embodiment, the four lower plate support regions are provided at two mutually parallel plate support rods, each plate support rod comprising a central region lying deep between the two plate support regions. Here the four lower support regions lie substantially equally around the plate's center of gravity of the plate so that an upper stop against tilting need not be provided.

A preferred possibility provides plate support rods on which the support regions are formed at support elements arranged on the rods. They may in particular be displaceable plastic rings or the like.

A deep-lying central region can also be created, when each plate support rod is bent out synclinally in the central region, so that it is adjustable through rotation around the vertical axis to the respective plate form. Thus, it is preferable that each plate support rod is provided on an end with an internal thread in which a screw penetrating the support beam engages so that it can be fastened in various positions.

In a further embodiment, it is provided that at least one plate support rod comprises a central recess and is arranged on an adjustable plate supporting arm that projects from the support beam.

A maximal space utilization is obtained in a further embodiment of the rack in which the rack comprises a bottom frame and a top frame to which the vertical support beams are fastened in two rows, individually adjustable on both sides of an imaginary central plane of the rack. In this embodiment, support beams and plate support rods form a pair of plate supporting racks per plate stack, preferably the plate support rods of one row projecting from the support beams in opposite direction to those of the second row and extending in particular vertically to the imaginary central plane.

The two rows on both sides of the central plane can be arranged next to one another, with the individual spacing adjustments which allow the supporting of plates of varying diameters remaining guaranteed. On each side at least one plate stack can be arranged. If two plate stacks are provided on each of the two sides, an approximate square standing area results. If the rack takes a rectangular form, three or four stacks can be arranged in each row.

A preferred embodiment provides that the bottom frame and the top frame, each, comprise frame rods enclosing a rectangle, and that the support beams are displaceably fastened on the long frame rods of the bottom frame and of the top frame. It is also possible to arrange the support beams of both rows along a single frame rod, which may lead to a slight offset of stacks of equal diameter.

If the short frame rods are on both sides extended outwardly beyond the frame corners of the bottom frame by a rod piece it is possible to fasten thereto in outermost position feet or swivel rollers and preferably also horizontal deflecting rollers so that optimum stability is obtained in spite of the narrow rectangular frame.

The frame rods are particularly formed by square profiles and the support beams by hollow profiles. Each support beam may have on each end a clamp which embraces the profile in longitudinally adjustable arrangement. If the support beams are hollow profiles the clamps are preferably formed as insertable end members.

A possibility of simple and quick mounting is provided by an embodiment in which plate support rods projecting in opposite direction from the support beams are formed by continuous rods and centrally fastened to a single support beam. Hence, the plate support rods project from each support beam on both sides. Mounting is further simplified by providing the support beams with laterally open slots in which the center regions of the continuous rods are locked. The laterally open slots which extend horizontally or downwardly at an incline have end portions which extend preferably vertically downwards and in which the continuous rods rest. In this embodiment, the support beams are preferably formed by U-profiles which, per pair of stacks, face each other with their open sides. Hence, the slots start from the free longitudinal edges of the side webs so that each continuous rod forming two plate support rods is arranged in two slots. The support beams may also comprise closed profiles in which the two slots are accessible by a transverse slot in the connecting fourth web of the profile. Since only one support beam per pair of stacks has to be adjustable for adapting the distance of the plate support rods to the plate diameters, mounting is further simplified by an arrangement in which the two outer support beams are rigidly connected to the bottom frame and the top frame and the inner support beams are adjustably connected to the bottom frame and the top frame. The distances between the support elements are adjustable in pairs in this arrangement, and 2 times 2 stacks with plates of different sizes can be arranged.

Locking of the continuous rods can be obtained in different ways, for example by end portions of the slots having areas of reduced width. Moreover, axial displacement of the continuous rods can be eliminated by various measures, e.g. by notches in the region of the side webs.

Locking as well as axial fixing are preferaby obtained by plastic elements which are fitted on the continuous rods on both sides and abut on the support beams. Preferably, the plastic elements border at least partly the slot rims. For locking the rods in the slots, a preferred embodiment provides that in the end face of each plastic element abutting on the support beams there is provided a transverse groove and that above the transverse groove there is provided a catch means for a tongue bent out from the support beams, the height of the catch means corresponding to the depth of the end portion of the slot formed below the tongue. The plastic elements may further form an anti-skid covering of the plate support rods so that they envelop the continuous rods with the exception of the center portions. Furthermore, at each plastic element there may be provided a forked piece with a receiving slot for the rim of the plate.

A disadvantageous alteration of the taste of prepared foods is hindered either through covers or, in another embodiment of the rack, by providing it with a casing of insulating panels which enclose the plate stacks and whose wall parts parallel to the center plane form doors.

Figure 2:
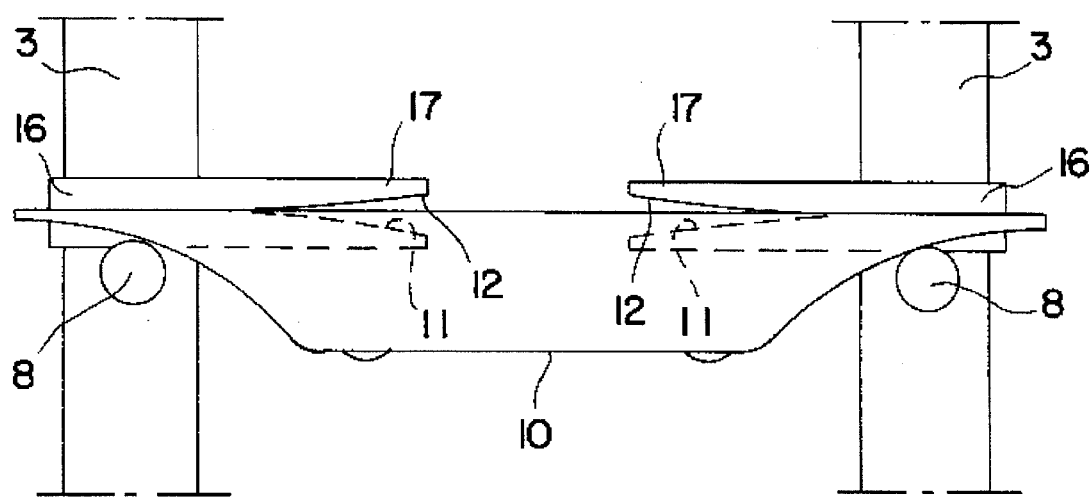
Figure 3:
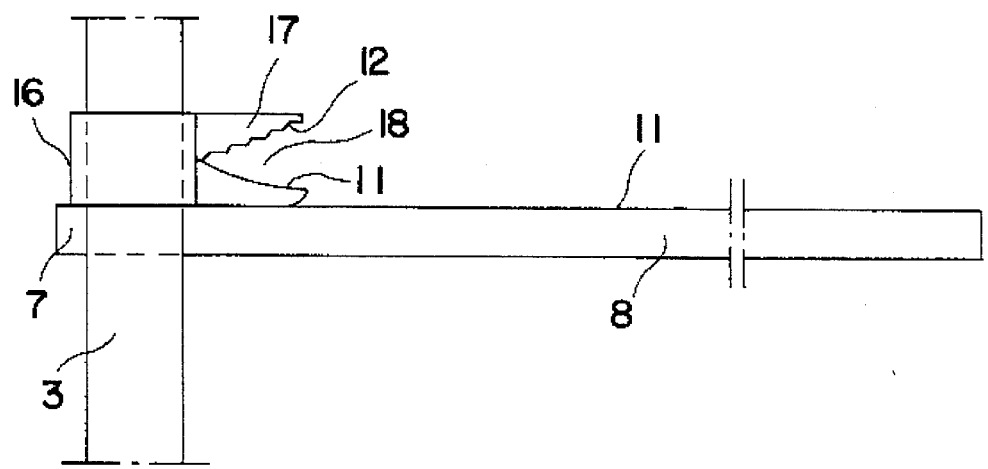
Figure 4:
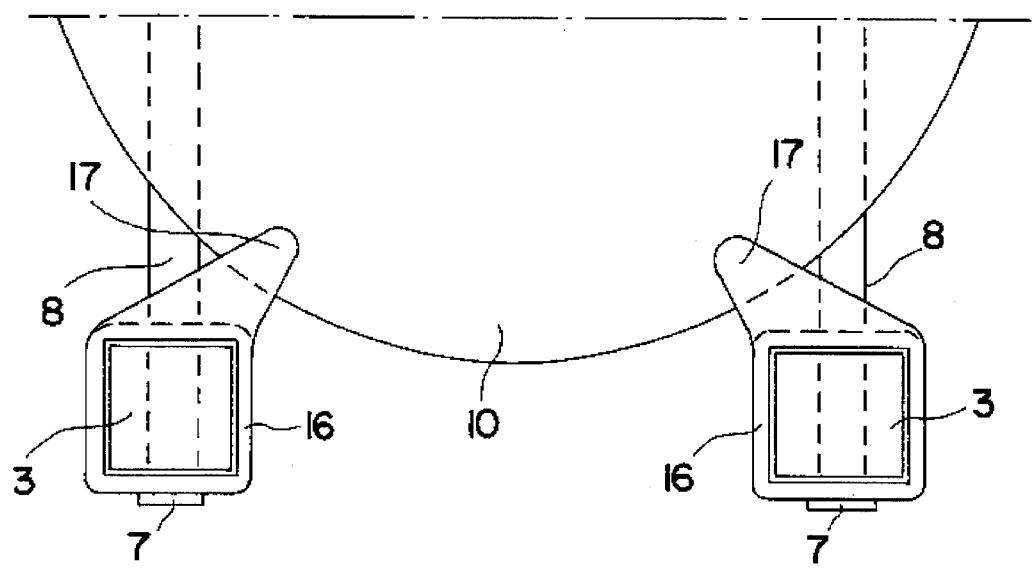
Figure 5:
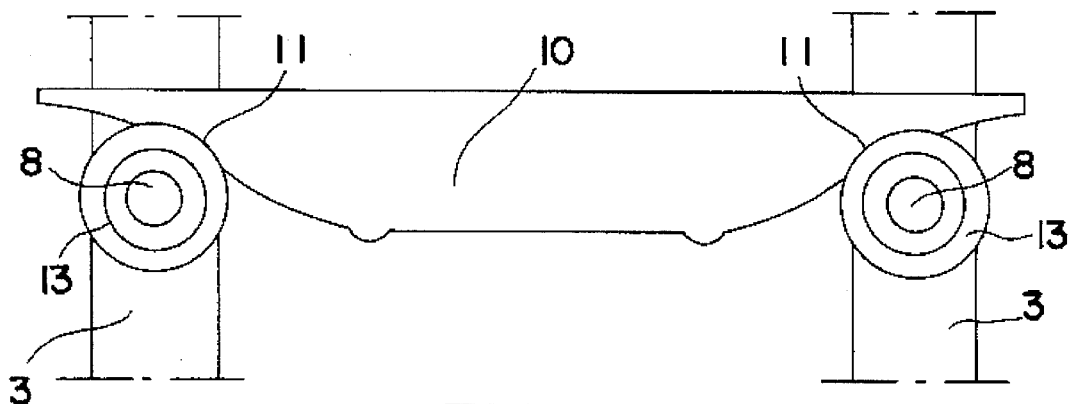
Figure 6:
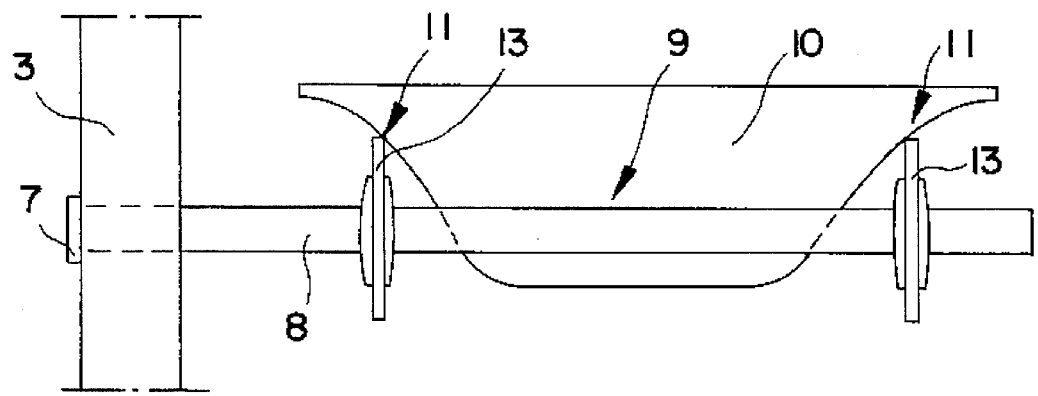
Figure 7:
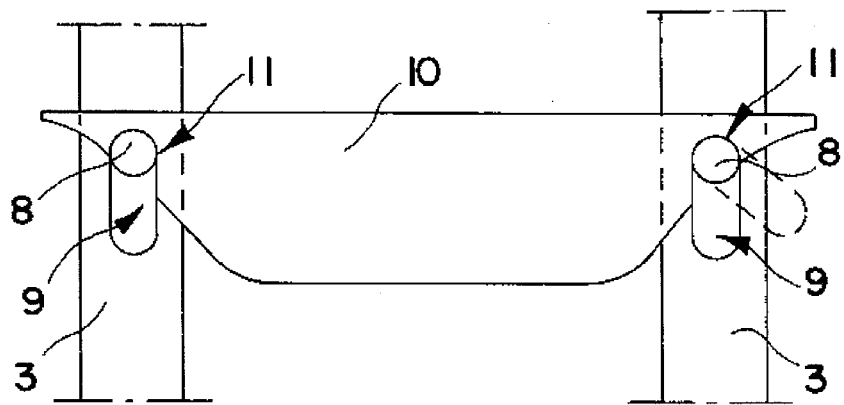
Figure 8:
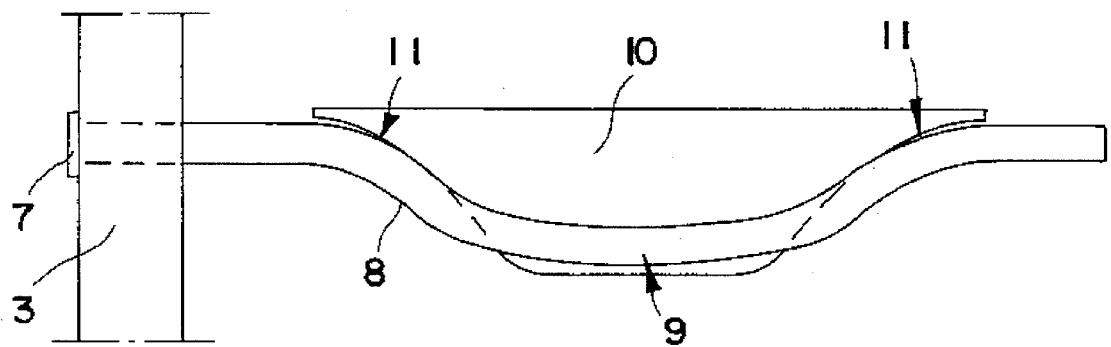
Figure 9:
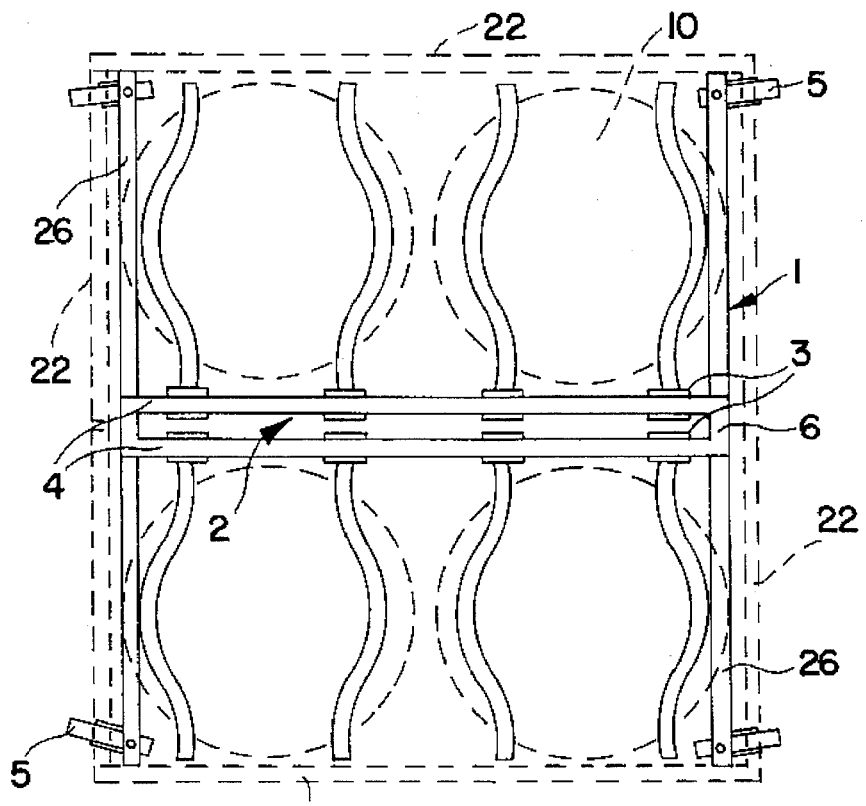
Figure 10:
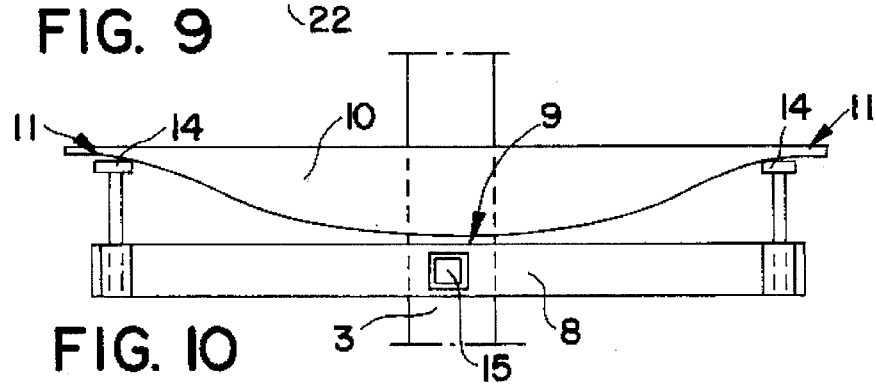
Figures 11, 12:
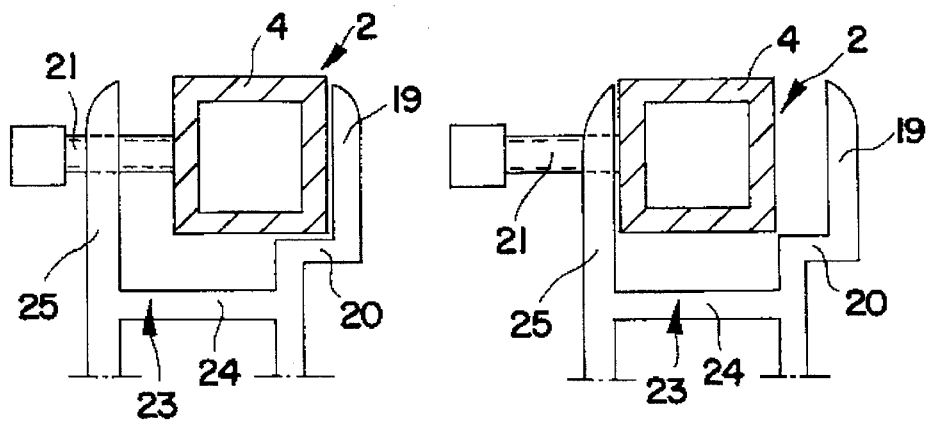
Figure 13:
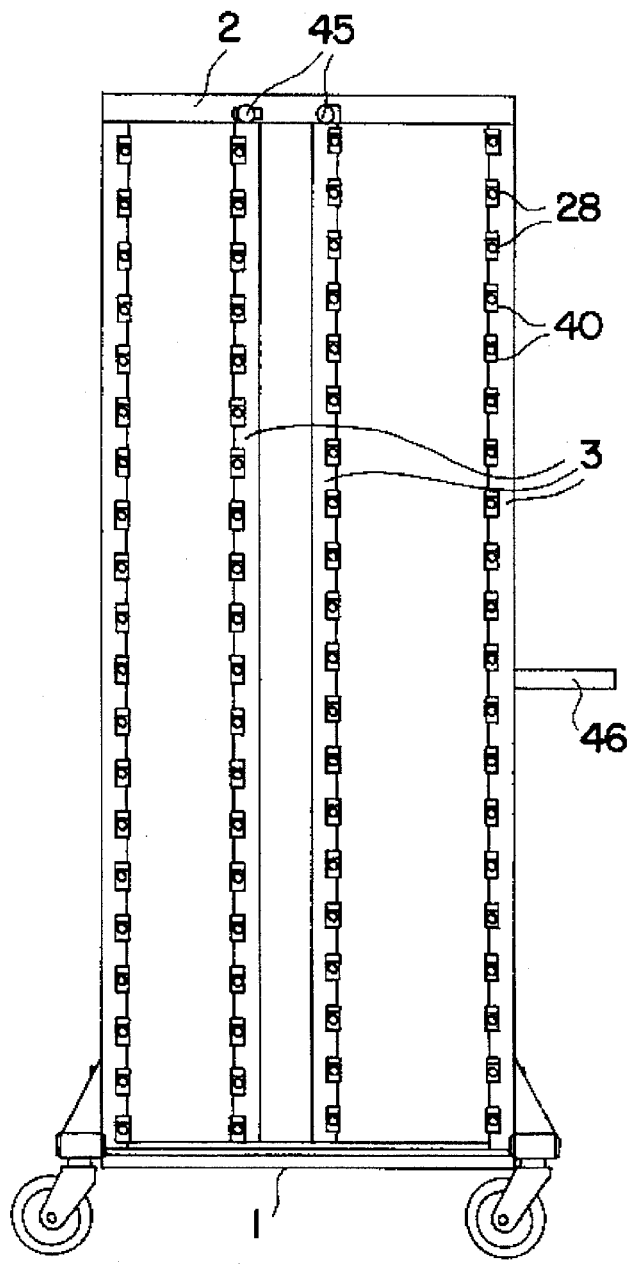
Figure 14:
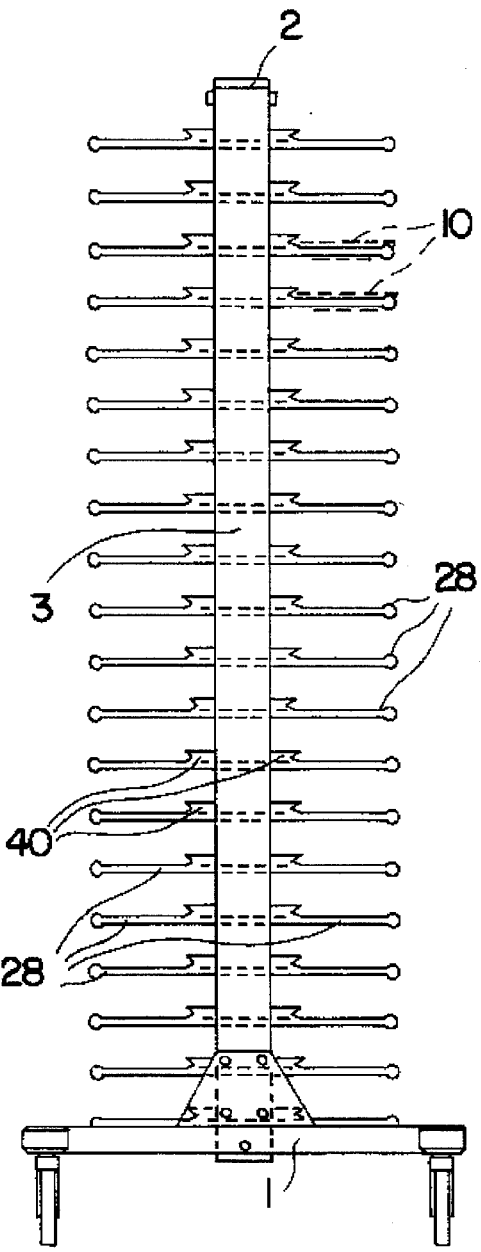
Figure 15:
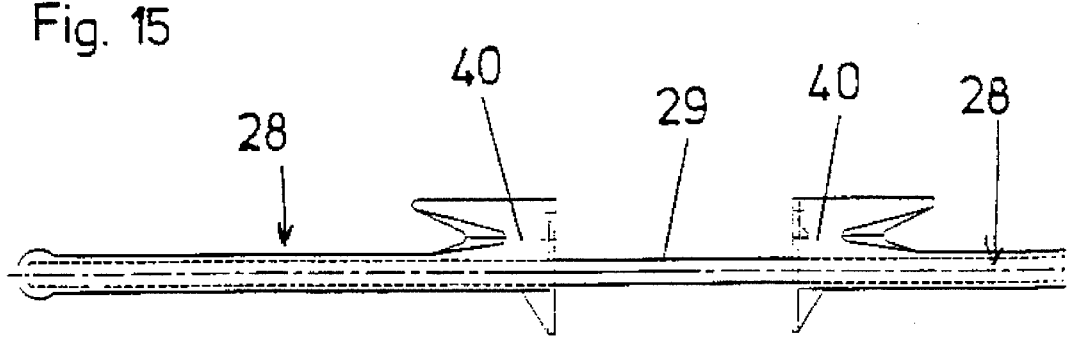
Figure 17:
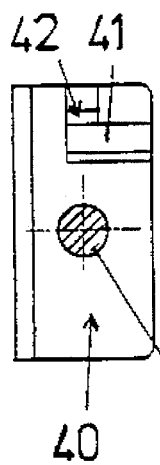
Figure 16:
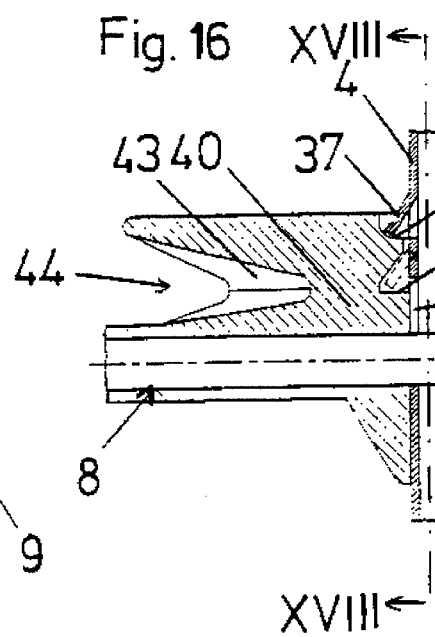
Figure 18:
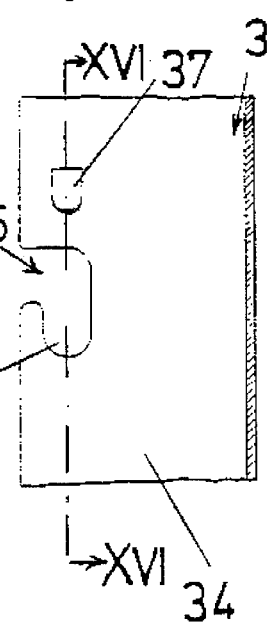

In the following the invention will be described in more detail by means of the figures of the accompanying drawing without being limited thereto. There show:

FIG. 1 a schematic side-view of a plate rack,

FIG. 2 a plate support of a first embodiment in front view,

FIG. 3 the plate support of the first embodiment in side view,

FIG. 4 the plate support of the first embodiment in top view,

FIG. 5 a plate support of a second embodiment in front view,

FIG. 6 the plate support of the second embodiment in side view,

FIG. 7 a plate support of a third embodiment in front view,

FIG. 8 the plate support of the third embodiment in side view,

FIG. 9 the plate support of the third embodiment in top view,

FIG. 10 a plate support of a fourth embodiment in front view,

FIGS. 11 and 12 a connection between a support beam and an upper frame rod in fixed and in released positions, FIG. 13 a front view of a fifth embodiment of the plate rack, FIG. 14 a side view of the fifth embodiment of the plate rack, FIG. 15 an enlarged view of a continuous rod with two plate support rods, FIG. 16 a longitudinal cross-sectional view of a rod fitted into a support beam along line XVI—XVI of FIG. 18, FIG. 17. a front view of a plastic element, and FIG. 18 a sectional view of a support beam along line XVIII—XVIII of FIG. 16.

A plate stand comprises a bottom frame 1 with rollers 5, a top frame 2 and support beams 3 connecting the two frames 1, 2. It serves for positioning two or more stacks of plates of the same or varying diameter at both sides of an imaginary central plane. The bottom frame 1 and the top frame 2 are made by combining square profile rods 4, 6 and have the form of a narrow rectangle, as is shown in top view in FIG. 9. In the embodiments according to FIGS. 1 through 8, a row of mutually parallel plate support rods 8 protrude from each support beam 3 and are, for example, rotatably fixed by means of screws 7 penetrating bores of the support beams. Two support beams 3 provided with plate support rods 8 form spaced supports for a stack of plates 10, which for example are filled with cold prepared foods. In order to hold these plates 10 free from wobble, for each plate at least a lower and preferably also an upper plate support region 11, 12 are provided, so that in each case the plate 10 is given a three-point fixture.

In the first embodiment shown in detail in FIGS. 2 through 4, in addition to the two plate support rods 8 having a lower plate support region 11, two support elements per plate are provided in the form of forked pieces 17 that protrude from the collars 16 enclosing the support beams. Each forked piece 17 has a V-shaped insertion slot 18 where the rim of the plate 10 is placed. The lower side surface of the insertion slot 18 forms a further lower plate support region 11 and the upper side surface an upper plate support region 12. Since the plate rests diametrically on the plate support rods 8, its position is, due to the bent form unstable and it tends to wobble, so that the two further plate support regions 11, 12 of the forked piece 17 stabilize the plate 10. This occurs independent of the fact to which side its center of gravity has shifted through filling of the plate 10. One such forked piece 17 per plate is sufficient. Also, for aesthetic reasons, two forked pieces 17 are provided, however. As is particularly evident from FIG. 4, the two forked pieces 17 project somewhat radially to the plate 10 into the free space between the two parallel plate support rods 8.

In the embodiments according to FIGS. 5 and 6, four lower plate support regions 11 are provided which are formed on the two rings 13 displaceably arranged on the two plate support rods 8. In this way, the most favorable support can be adjusted for each plate or each plate size. Through the arrangement of the rings 13, the lower plate support regions 11 are spaced from the plate support rod 8 so that the plate support rod 8 comprises a deeper central region 9 with regard to the lower plate support region 11. The plate rests thus only on the four rings 13.

Likewise, a deeper central region 9 is also provided in the embodiments according to FIGS. 7 through 9, in which each plate support rod 8 is synclinally bent between the two lower support regions 11. The plate support rod 8 is held on the support beam 3 through the screw 7 and is rotatable around its longitudinal axis and non-rotatably fixable in various angular positions, as represented in FIG. 7 on the right in broken lines. Corresponding notches or the like on the screw 7 that can cooperate with the counter-elements on the support beam 3 can be provided for this purpose.

In the embodiment according to FIG. 10, only one support beam 3 is provided per plate stack, from which a supporting arm 15 protrudes, that for example is also fixed by a screw. Two plate support rods 8 are slid on the supporting arm 15 and have in each case a perforation. The supporting arm 15 and the perforation are particularly non-circular so that an additional fixation of the plate support rods 8 is not necessary. Lower support regions 11 are formed at adjusting screws 14. Obviously, rings 13 could also be provided here. In this embodiment, only one plate support rod 8 can be arranged on the supporting arm 15, whereby the two further plate support regions similar to FIGS. 2 through 4 are provided at a forked piece 17 that protrudes centrically from the support beam 3.

The vertical spaces between the individual plate support rods 8 are so selected that the plate 10, also with the covering, not shown, can be easily inserted and removed.

FIG. 9 shows an approximately square base surface, when four plate stacks are arranged in two rows. The space between the two support beams 3 provided for each plate stack is adaptable through the shifting of at least one of the support beams 3 along one long frame rod 4, each, of the bottom frame 1 and of the top frame 2 to the plate diameter. As an extension of the short frame rods 6 of the bottom frame 1, rod pieces 26 extend at whose ends the swivel rollers 5 and horizontal deflection rollers are provided so that the rack is easily movable. The insertion and removal of plates is carried out from opposing sides, in each case perpendicular to the imaginary central plane, between the longer frame rods 4, so that the rack also under limited space conditions can advantageously be used due to the fact that not each of the four sides need be accessible.

In FIGS. 1 and 9, a casing made of insulating panels 22 or the like is drawn in broken lines which is supported by the bottom frame 1 and by its rod pieces 26 lengthening the shorter frame rods 6. The insulating casing has doors on the two inserting or removing sides.

The fixation of the support beams 3, which are formed as hollow profiles, on the lower long frame rods 4 is effected with C-shaped clamps that are inserted in the hollow-profiles. Each support beam 3 is on the long frame rod 4 fixed in the desired position by a clamp screw screwed into the clamp and not shown. Of course, any other clamps are also possible, as is the possibility for fixation at smaller interspaces, for example through the formation of rows of holes, etc.

For the fixation to the long frame rods 4 of the top frame 2, a clamp 23 according to FIGS. 11 and 12 is provided. The clamp 23 has a bottom web 24 provided with a stepped portion 20 from which flanges which are insertable into the support beam 3 extend downwardly. Two side webs 25 and 19 stand up from the floor web 24, with a clamp screw 21 being arranged in the side web 25. As shown in FIG. 11, a frame rod 4 lies on the stepped portion 20 and is pressed against the side web 19 adjoining the stepped portion 20 by the clamp screw 21, wherethrough the support beam 3 is fixed on the frame rod 4. If the screw 21 and the lower clamp belonging to the support beam 3 is released, the clamp can be pressed into the position shown in FIG. 12, in which the frame rod 4 no longer rests on the stepped portion 20. The support beam 3 is thus freely displaceable without clamp.

Plate racks according to the invention for 4 plate stacks can, with a support spacing of 8 cm and a height of approximately 1.85 m hold 20 plates per stack, i.e. 80 plates, that, if need be, can be covered by a hood (not shown) protecting the prepared foods, and require a standing area of approximately 0.4 m$^2$.

In the embodiment according to FIGS. 13 through 18, there is shown a rack, provided with a handle 46, for the positioning of plates in a number of stacks, for example four or six. The plate rack has a substantially H-shaped bottom frame 1 with swivel rollers from which support beams 3, particularly in the form of U-profiles, extend vertically. The outer support beams 3 are rigidly connected to the bottom frame 1, whereas the inner support beams 3 are, at least over a portion, adjustably arranged along the central flange of the bottom frame 1. At the upper side, the support beams 3 are connected by a transverse web of a top frame 2, the inner support beams 3 being fixable in various positions by means of adjustable holding means 45 so that the distance between the support beams 3 can be changed. Plate support rods 28 project from each side of the support beams 3 so that for each stack there are provided two parallel, ridge or rake-like support elements, the distance between them being adaptable to the diameter of the plate 10 to be received. Two of the plate support rods 28, each, projecting on both sides are formed by a continuous rod 29 which is fitted into slots 35 of the support beam 3 and secured against axial displacement by plastic elements 40. As shown in FIG. 15, the plastic elements 40 envelop the plate support rods 28 completely so that they also form an anti-skid covering. Moreover, at the plastic elements 40, there is provided a forked piece 43 which has a receiving slot 44 for the rim of the plate to be positioned which is thus held down from above and rests in wobble-free position.

As can be seen from FIGS. 16 through 18, the slots 35 in the lateral webs 34 of the U-shaped support beams 3 extend from the free longitudinal edge horizontally to the inside and have an end portion 36 extending vertically downwards, the rod 29 resting therein. Above each slot 35, a tongue 37 is bent outwardly from the side web 34 at an incline, said tongue holding down the plastic element 40. As can be seen from FIG. 17, the latter-mentioned has in the end face abutting on the side web 34 a horizontal transverse groove 41 and a catch means 42 extending vertically upwards.

Continuous rod 29 to which the two plastic elements 40 are fitted is inserted in the corresponding slots 35 in the two lateral webs 34 of the support beam 3, the tongues 37 engaging in the two transverse grooves 41, as shown in FIG. 16 with broken lines. Then, rod 29 is pressed down into the end portions 36, the tongues 37 engaging above the catch means 42 and holding down the plastic elements 40. Since each catch means 42 comprises a recess in the plastic element into which the tongue 37 projects, lateral fixation and security against torsion of the plastic element 40 are obtained. The depth of the end portion 36 of the slot 35 corresponds in this arrangement to the height of the catch means 42. The rim portion of each slot 35 may be bordered or embraced by a web of the plastic element 40. The plate rack of this construction can be assembled relatively quickly and without any particular auxiliary means because of the low number of component parts since the plate support rods 28 need not be individually fixed by screwing.

What is claimed is:

1. A rack for the spaced-apart positioning of plates having a rim in at least one stack, comprising a bottom frame, a top frame, at least one vertical support beam mounted on the bottom frame and on the top frame, and support elements carried by said vertical support beam, each of said support elements comprising two plate support rods having a first and a second lower plate support region and a forked piece with a laterally open insertion slot, said forked piece having a third lower and a fourth upper plate support region.

2. A rack according to claim 1, wherein said insertion slot is V-shaped.

3. A rack according to claim 2, wherein said fourth upper plate support region comprises stepped portions.

4. A rack for the spaced-apart positioning of plates in at least two stacks, comprising a bottom frame, a top frame, vertical support beams mounted on the bottom frame and on the top frame, an imaginary vertical central plane, and support elements carried by said vertical support beams and comprising two mutually parallel plate support rods, each, said plate support rods being arranged in two rows on both sides of said imaginary vertical central plane and projecting in opposite directions from said support beams.

5. A rack according to claim 4, wherein said vertical support beams are arranged in two rows, individually adjustable on both sides of said imaginary vertical central plane of rack rack.

6. A rack according to claim 4, wherein said bottom frame and said top frame, each, comprise frame rods enclosing a rectangle, and said support beams are fastened to the long frame rods of said bottom frame and said top frame.

7. A rack according to claim 5, wherein said frame rods are square profiles.

8. A rack according to claim 4, wherein said plate support rods are formed by continuous rods centrally arranged at one of said support beams.

9. A rack according to claim 8, wherein said support beams have laterally open slots and said continuous rods have central regions locked in said laterally open slots.

10. A rack according to claim 9, wherein said slots comprise end portions extending vertically downwards.

11. A rack according to claim 8, wherein said support beams are formed by U-profiles having lateral webs and said slots are arranged in said lateral webs of said U-profiles.

12. A rack according to claim 11, wherein said lateral webs have free lateral edges, said U-profiles face each other in pairs, and said slots start from said free lateral edges.

13. A rack according to claim 8, wherein outer support beams are rigidly connected to said bottom frame and said top frame, and wherein inner support beams are adjustably connected to said bottom frame and said top frame.

14. A rack according to claim 8, wherein said continuous rods pass through plastic elements abutting on said support beams and securing said continuous rods against longitudinal displacement.

15. A rack according to claim 14, wherein said plastic elements border at least partly rims of said slots.

16. A rack according to claim 14, wherein said support beams comprise tongues bent out from said support beams above said slots, and said plastic elements are at said support beams held down by said tongues.

17. A rack according to claim 14, wherein each of said plastic elements abutting on said support beam has an end face provided with a transverse groove, and wherein a catch means for said tongue is provided above said transverse groove, the height of said catch means corresponding to the depth of the end portion of the slot formed below said tongue.

18. A rack according to claim 14, wherein at said plastic elements one forked piece, each, having a receiving slot for the rim of said plates is provided.

19. A rack for the spaced-apart positioning of plates in at least one stack, comprising a bottom frame, a top frame, at least one vertical support beam mounted on said bottom frame and on said top frame, support elements carried by said vertical support beam and having plate support rods, and a casing of insulating panels which has doors at least on two sides.

* * * * *